United States Patent
Kurmlavage

(10) Patent No.: US 12,048,393 B2
(45) Date of Patent: Jul. 30, 2024

(54) ROLLER GRILL FOOD WARMER

(71) Applicant: Michael M Kurmlavage, Monroeville, NJ (US)

(72) Inventor: Michael M Kurmlavage, Monroeville, NJ (US)

( * ) Notice: Subject to any disclaimer, the term of this patent is extended or adjusted under 35 U.S.C. 154(b) by 510 days.

(21) Appl. No.: 17/470,782

(22) Filed: Sep. 9, 2021

(65) Prior Publication Data

US 2022/0071442 A1    Mar. 10, 2022

Related U.S. Application Data

(60) Provisional application No. 63/075,990, filed on Sep. 9, 2020.

(51) Int. Cl.
*A47J 36/06* (2006.01)
*A47J 37/04* (2006.01)

(52) U.S. Cl.
CPC .............. *A47J 36/06* (2013.01); *A47J 37/048* (2013.01)

(58) Field of Classification Search
CPC .................................................. A47J 37/048
See application file for complete search history.

(56) References Cited

U.S. PATENT DOCUMENTS

| 4,516,485 A * | 5/1985 | Miller ................... | A47J 37/067 |
| | | | 99/441 |
| 6,349,634 B1 * | 2/2002 | Delpierre, III ........ | A47J 37/049 |
| | | | 99/441 |
| 9,557,004 B1 * | 1/2017 | McGrath ............... | F16M 13/02 |
| 2002/0014162 A1 * | 2/2002 | Huegerich ............ | A47J 37/048 |
| | | | 99/441 |
| 2011/0056387 A1 * | 3/2011 | Kurmlavage ......... | A47J 37/048 |
| | | | 99/352 |
| 2014/0033929 A1 * | 2/2014 | Humphrey ............ | A47J 37/048 |
| | | | 99/332 |

FOREIGN PATENT DOCUMENTS

| CN | 108201367 A | * | 6/2018 | ............ A47J 37/048 |
| CN | 108618648 A | * | 10/2018 | |

* cited by examiner

*Primary Examiner* — John J Norton
(74) *Attorney, Agent, or Firm* — Argus Intellectual Enterprise, LLC; Daniel Enea; Jordan Sworen

(57) ABSTRACT

Provided is a combination food warmer and sneeze guard cover for a roller grill. The device includes a transparent cabinet with a pair of doors and optionally one or more food shelves. The cabinet functions as a sneeze guard cover to prevent contaminants, pathogens, insects, and the like from contacting food contained on a roller grill. The cabinet additionally utilizes the roller grill heating elements to indirectly keep pre-cooked food contained on the shelves in a warm state. The shelves can be inserted and removed as desired, and further include one or more removable sections to allow access to the roller grill heating elements. The device can be retrofitted to function with existing roller grills, and can be quickly installed and removed as desired.

9 Claims, 4 Drawing Sheets

ROLLER GRILL FOOD WARMER

CROSS-REFERENCE TO RELATED APPLICATIONS

This application claims the benefit of U.S. Provisional Application No. 63/075,990 filed on Sep. 9, 2021, entitled, "Roller Grill Food Warmer". The above identified patent application is herein incorporated by reference in its entirety to provide continuity of disclosure.

FIELD OF THE INVENTION

The present invention relates to a roller grill. More particularly, it pertains to a combination food warmer and sneeze guard cover for a roller grill to indirectly keep food warm and to enhance protection of the food products from exposure to contaminants, pathogens, insects, and the like.

BACKGROUND OF THE INVENTION

In this era of fast food, individuals are increasingly dependent on quick service restaurants and convenience stores for a meal. Beginning in the 1960s and increasing in popularity ever since, the roller grill became an efficient way to cook and store hot dogs and other products to be made readily available to consumers without being labor intensive. With the advent of roller grills, these products can be prepared without the necessity of the store clerk flipping or rolling the grilled food by hand throughout the day. The development of the gas station/convenience store made this type of food even more widely available and popular.

With opportunities to sell more products in these numerous establishments, the industry began offering additional types of hot dog products, such as sausage, quarter-pound hot dogs, spicy and mild kielbasa, alternative meat hot dogs, such as turkey, beef or soy, and the like. All of these foods are still best prepared using the roller grill. Indeed, presently roller grills are still the leading hot dog cooker of choice for national convenience store chains, vending operations and cafeterias. These roller grills can be used on the front serving counter where customers serve themselves or on a back counter where a store employee takes an order from a customer and assembles and serves the food product.

With the emergence of the COVID-19 pandemic in early 2020, restaurants and grocery stores have been forced to change their food service policies. For example, stores began implementing procedures to enforce "social distancing" policies by placing markers on the floor indicating where to stand, directional arrows to indicate the flow of traffic through the store, and the installation of plexiglass shields at checkouts to better protect cashiers from human-to-human transmission of pathogens. In addition, virtually all stores stopped utilizing their roller grills during the pandemic, as recommended by the CDC, local, and state authorities.

As evidenced above, it is clear that enhanced safety measures are required for the food service industry, particularly relating to roller grills. Food retailers wish to utilize the expensive roller grills that they invested in instead of being forced to leave them on a counter in an unused state. Therefore, a need exists for enhancing the safety of conventional roller grills in order to prevent the spread of pathogens between consumers utilizing these devices.

SUMMARY OF THE INVENTION

The present invention overcomes the current problems that exist with conventional roller grills by providing a combination food warmer and sneeze guard cover. The device comprises a transparent cabinet with a pair of doors and optionally one or more food shelves. The cabinet functions as a sneeze guard cover to prevent contaminants, pathogens, insects, and the like from contacting food contained on a roller grill. The cabinet additionally utilizes the roller grill heating elements to indirectly keep pre-cooked food contained on the shelves in a warm state. The cabinet functions as a converter or conversion apparatus that can be retrofitted to temporarily or permanently make a roller grill a warmer case, a display case, and the like, with or without the use of heat. The shelves can be inserted and removed as desired, and further include one or more removable sections to allow access to the roller grill heating elements. The device can also be retrofitted to fit existing roller grills that are well understood in the art.

OBJECTS OF THE INVENTION

In view of the foregoing disadvantages inherent in the known types of food warmer and sneeze guard covers for use with roller grills now present in the prior art, the present invention provides a food warmer and sneeze guard cover apparatus, wherein the same can be utilized to keep food warm and protect food from contamination.

It is therefore an object of the present invention to provide a new and improved food warmer and sneeze guard cover apparatus that has all of the advantages of the prior art and none of the disadvantages.

It is another object of the present invention to provide a food warmer and sneeze guard cover apparatus for use with roller grills that are known and used in the art.

Another object of the present invention is to provide a food warmer and sneeze guard cover apparatus that functions as a warming cabinet.

Yet another object of the present invention is to provide a food warmer and sneeze guard cover apparatus that prevent contaminants, pathogens, insects, and the like from contacting food contained on a roller grill.

Another object of the present invention is to provide a food warmer and sneeze guard cover that can be removably secured to a conventional roller grill assembly.

A final object of the present invention is to provide a food warmer and sneeze guard cover apparatus that is made from a transparent material to permit ease of viewing the contents of the roller grill assembly.

Other objects, features and advantages of the present invention will become apparent from the following detailed description.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. For the purposes of presenting a brief and clear description of the present invention, the preferred embodiment will be discussed as a combination food warmer and sneeze guard cover for use with a conventional roller grill. The figures are intended for representative purposes only and should not be considered to be limiting in any respect.

Figure 1:
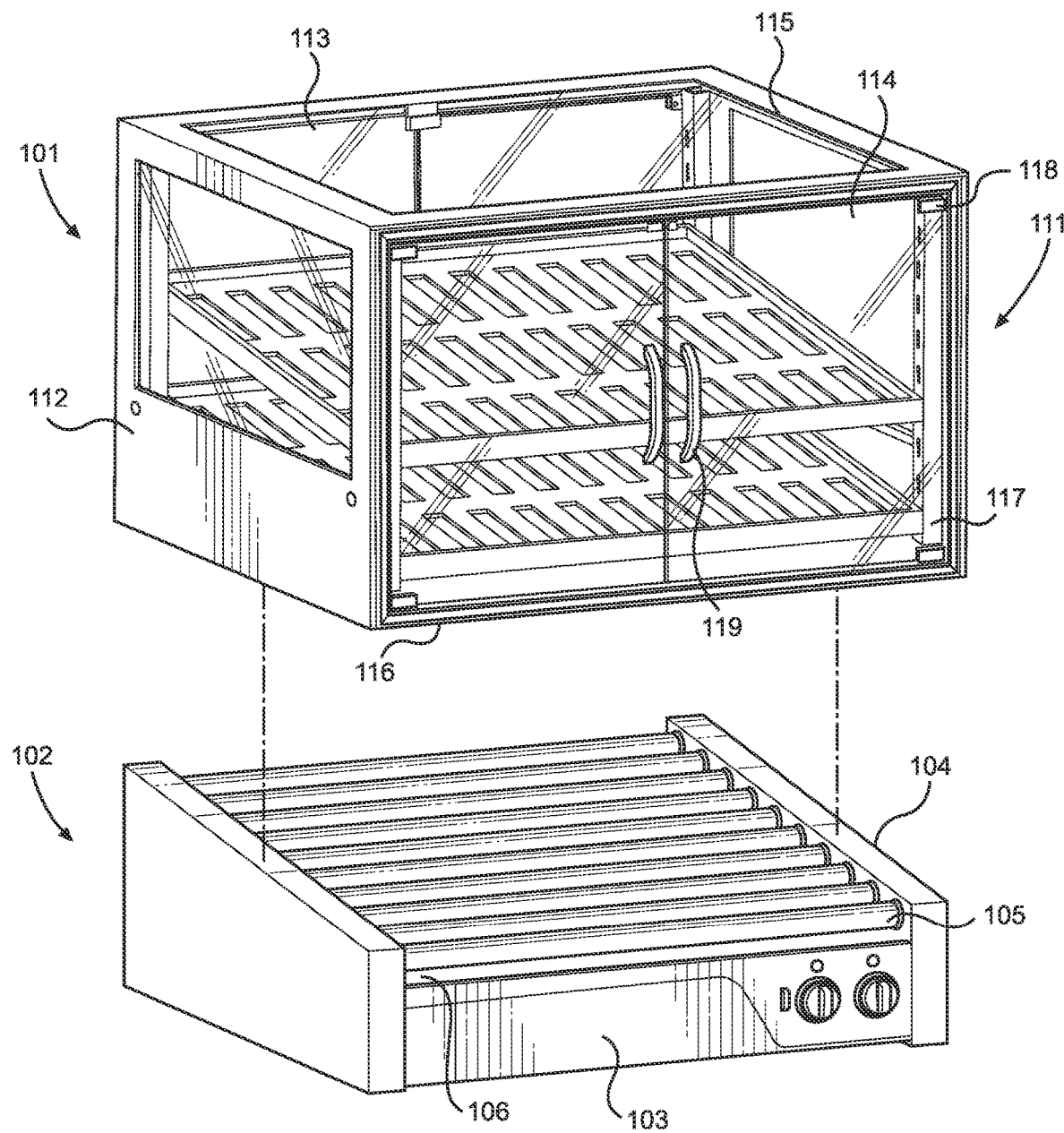
FIG. 1 shows a view of the food warmer and sneeze guard cover for a roller grill assembly.

Referring now to FIG. 1, there is shown a view of the food warmer and sneeze guard cover 101 for a roller grill assembly 102. The roller grill assembly 102 comprises a housing comprising a main body 103 and a pair of angled sidewalls 104 extending above said body, a plurality of spaced apart tubular rollers 105 disposed between the sidewalls 104, and a heating element 106. The food warmer and sneeze guard cover 101 comprises a cabinet 111 with a pair of side panels 112, a back 113, a pair of doors 114, a top panel 115, an open bottom 116, and an internal frame 117. The open bottom 116, pair of side panels 112, back 113, and doors 114 slide over top of the pair of sidewalls 104 of the roller grill assembly 102, wherein the internal frame 117 is removably supported by the pair of sidewalls 104 of the roller grill assembly 102. The pair of side panels 112, back 113, and doors 114 extend below the side walls 104 to create a seal between the roller grill assembly 102 and the cabinet 111 to when the pair of sidewalls 104 supports the internal frame 117. The configuration prevents heat from escaping from roller grill assembly 102 and the cabinet 111.

The food warmer and sneeze guard cover 101 comprises a cabinet 111 with a pair of side panels 112, a back 113, a pair of doors 114, a top panel 115, an open bottom 116, and an internal frame 117. The cabinet 111 is preferably substantially constructed from a transparent material, such as plexiglass, glass, or the like. The front of the cabinet 111 preferably includes one or more doors. In one embodiment, the cabinet 111 can include a pair of doors 114 that are attached via hinges 118. A pair of handles 119 enable a user to quickly open and close the doors 114 as desired. The doors 114 are maintained in a closed position via a set of magnets (not shown) or the like. The cabinet 111 is positioned on the roller grill assembly 102 to provide a barrier to protect food products from contaminants, pathogens, and the like that are expelled from the mouth or nose of a person on the opposite side of the cabinet 111. The cabinet 111 further functions as a food display case.

Figure 2:
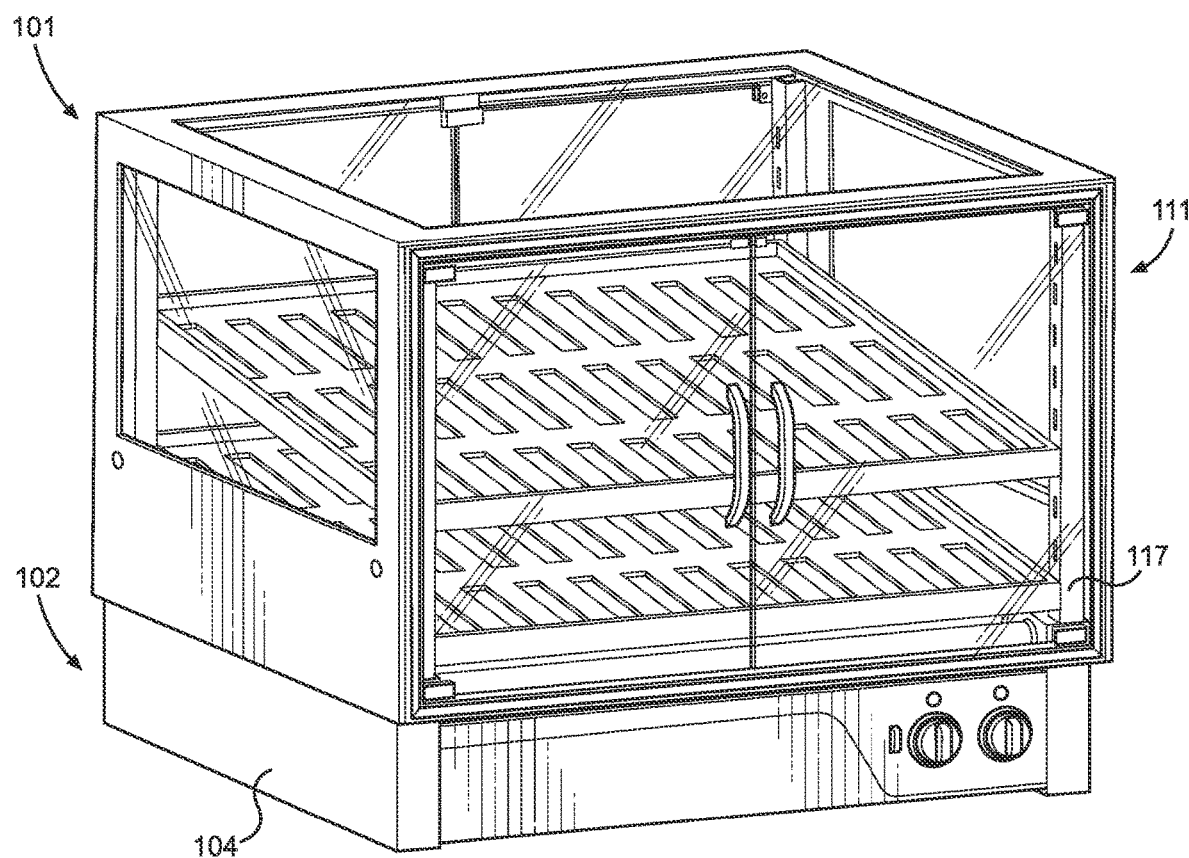
FIG. 2 shows a perspective view of the food warmer and sneeze guard cover installed on a conventional roller grill.

Referring now to FIG. 2, there is shown a perspective view of the food warmer and sneeze guard cover 101 installed on a conventional roller grill 102. The cabinet 111 functions as a converter or conversion apparatus that can be retrofitted to temporarily or permanently make a roller grill assembly 102 into a warmer case, a display case, and the like, with or without the use of heat. The cabinet 111 is designed to rest on the angled sidewalls 104 of the internal frame 117 of existing and known roller grill assemblies 102 that are commonly found in convenience stores, gas stations, grocery stores, and the like. The cabinet 111 can be designed in any configuration to rest on the sidewalls 104 of the roller grill assembly 102, and can be installed without the need for modification to the roller grill assembly 102. This design enables the cabinet 111 to be quickly installed and removed for cleaning or when use thereof is not desired. The cabinet 111 slides over top of the pair of sidewalls 104 of the roller grill assembly 102 such that the cabinet 111 is supported in a parallel position relative to the roller grill assembly 102 by the angle of the internal frame 117 with respect to the angle of the sidewalls 104. The exterior of the cabinet 111 can include advertising indicia to indicate the type of food products being offered for sale, the price thereof, and any sales or specials associated with the items contained therein. Finally, the cabinet 111 can also be retrofitted to fit existing roller grill assemblies 102 that are well understood in the art.

Figure 3:
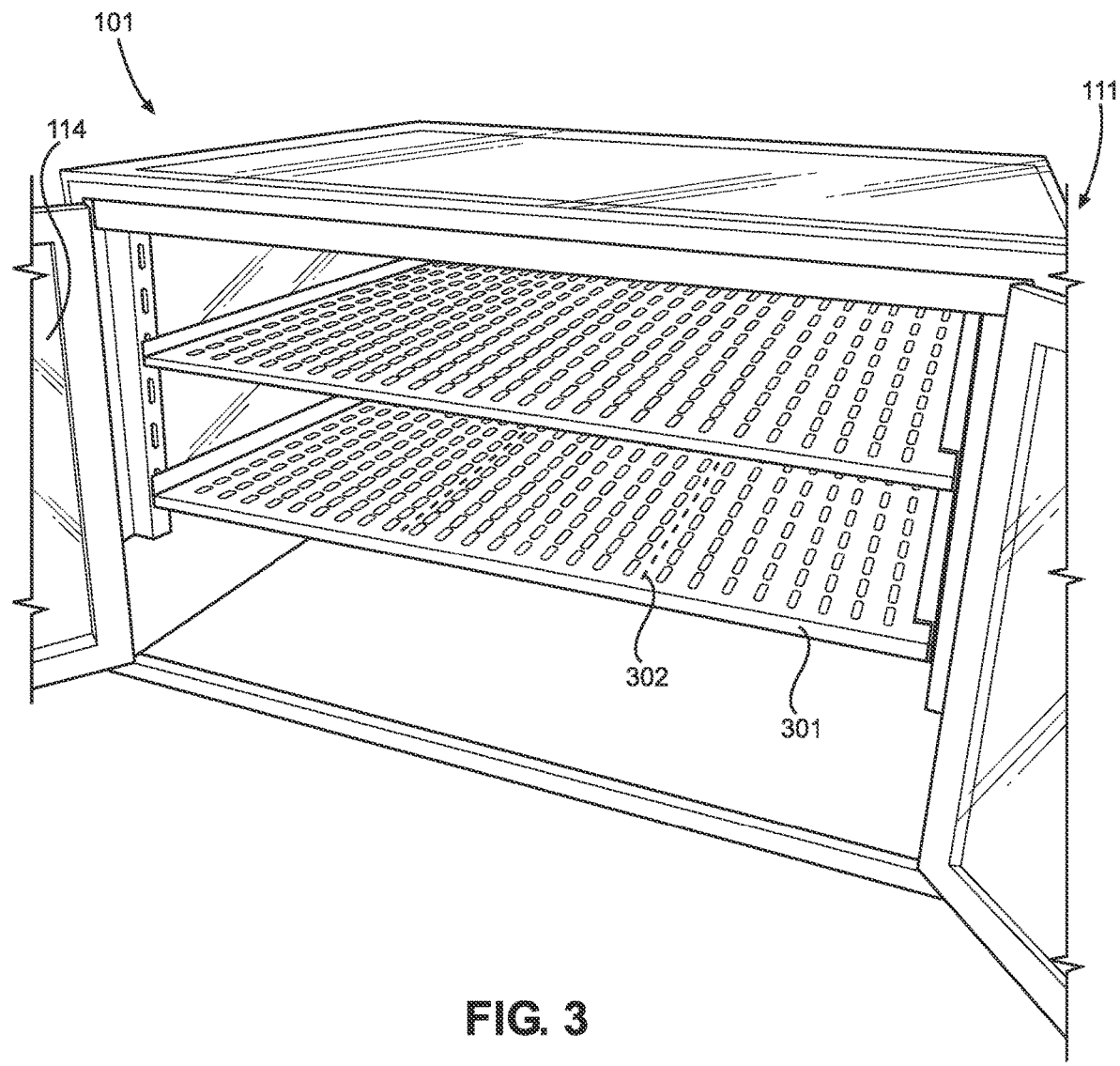
FIG. 3 shows a perspective view of the food warmer and sneeze guard cover with the doors open.

Referring now to FIG. 3, there is shown a perspective view of the food warmer and sneeze guard cover 101 with the doors 114 open. Within the cabinet 111 can be one or more food shelves 301. The shelves 301 are designed to hold food items that have previously been cooked or heated. As can be appreciated, the cabinet 111 rests on top of the the pair of sidewalls 104 as shown in FIG. 1, and retains the heat created by the roller grill heating elements 106. This, in turn, enables the cabinet 111 to function as a warming device to indirectly heat the items contained therein. Non-limiting examples of the types of food that can be kept warm within the cabinet 111 include pre-made breakfast sandwiches, pizza, hot dogs, chicken, and the like.

The one or more shelves 301 can also include one or more removable sections 302, as indicated by the dotted lines, to provide access to the roller grill heating elements 106 that are shown in FIG. 1. The removable sections 302 allow food to be cooked directly on the roller grill heating elements 105 in a conventional manner. As can be appreciated, foods, such as sausage, quarter-pound hot dogs, spicy and mild kielbasa, alternative meat hot dogs, such as turkey, beef or soy, and the like are best prepared using the roller grill. The combination of the shelves 301 and the removable sections 302 enables a retail store to utilize the roller grill in a conventional manner for cooking traditional hot dog products, and enhances the functionality of the roller grill by enabling it to serve as a warmer for pre-heated food.

Figure 4:
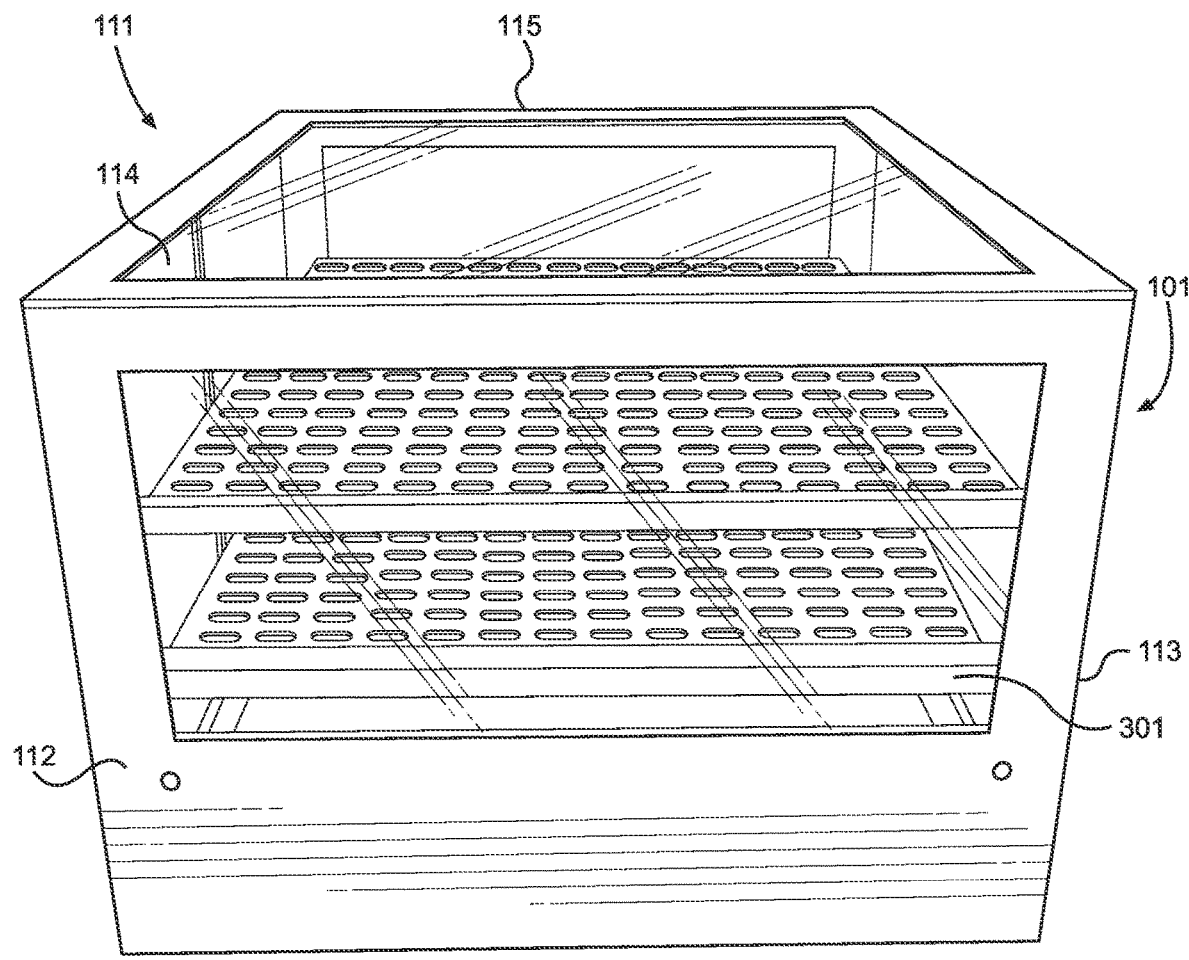
FIG. 4 shows a side view of the food warmer and sneeze guard cover.

Referring now to FIG. 4 there is shown a side view of the food warmer and sneeze guard cover 101. In addition to providing one or more shelves 301 for maintaining pre-cooked food in a warm condition, the cabinet 111 of the present invention additionally functions as a sneeze guard to provide a barrier to protect food products from contaminants, pathogens, and the like that are expelled from the mouth or nose of a person on the opposite side of the cabinet. As described above, cabinet 111 comprises a pair of side panels 112, a back 113, a pair of doors 114, a top panel 115, which are all preferably constructed of a transparent material. The cabinet 111 completely encloses the roller grill and the contents thereof, which significantly reduces the contact and exposure between consumers and the food. The transparent nature of the cabinet 111 provides unrestricted viewing of the contents therein, which further enhances food presentation, and can thereby increase impulse purchases and therefore, revenue.

Overall, the present invention provides a new and improved food warmer and sneeze guard cover for a roller grill. The device enhances the protection afforded by traditional roller grill by creating a cabinet that prevents contaminants, pathogens, and the like that are expelled from the mouth or nose of a person from contacting the food on the roller grill. The device can be readily utilized with existing roller grills by replacing the existing cover and retrofitting thereto, thereby providing a cost effective and simple solution to increase food safety for consumers. Finally, the device enhances the functionality of traditional roller grills by enabling the grill to serve as a warming cabinet for pre-cooked food.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A food warmer and sneeze guard cover for a roller grill assembly, said roller grill assembly having a housing comprising a main body and a pair of angled sidewalls extending above said body, a plurality of spaced apart tubular rollers disposed between said sidewalls, a heating element; said food warmer and sneeze guard cover comprising:
   a cabinet with a pair of side panels, a back, a pair of doors, a top panel, an open bottom, and an internal frame;
   wherein said open bottom, said pair of side panels, said back, and said pair of doors slide over the top of said pair of sidewalls of said roller grill assembly such that said cabinet is supported in a parallel position relative to said roller grill assembly by the angle of said internal frame with respect to the angle of said sidewalls;
   wherein said pair of side panels, said back, and said pair of doors extend down below said side walls to create a seal between said roller grill assembly and said cabinet when said pair of sidewalls support said internal frame, thereby preventing heat from escaping from said roller grill assembly and said of cabinet.

2. The device of claim 1, wherein said internal frame is angled to support said cabinet in a level configuration when supported by said angled side sidewalls of said roller grill assembly.

3. The device of claim 1, wherein said cabinet doors comprise handles.

4. The device of claim 1, wherein said pair of side panels, said back, said pair of doors, and said top panel of said cabinet are substantially constructed of a transparent material.

5. The device of claim 1, wherein said cabinet comprises one or more shelves.

6. The device of claim 5, wherein said one or more shelves comprises one or more removable sections to provide access to said roller grill heating elements.

7. A food warmer and sneeze guard cover for a roller grill assembly, said roller grill assembly having a housing comprising a main body and a pair of angled sidewalls extending above said body and further comprising front, back, side, and upper surfaces, a plurality of spaced apart tubular rollers disposed between said sidewalls, and a heating element; said food warmer and sneeze guard cover comprising:
   a cabinet with a pair of side panels, a back, a pair of doors, a top panel, an open bottom, and an internal frame;
   wherein said internal frame is removably supported by said pair of sidewalls of said roller grill assembly;
   wherein said open bottom, said pair of side panels, said back, and said pair of doors slide over the top of said pair of sidewalls of said roller grill assembly such that said cabinet is supported in a parallel position relative to said roller grill assembly by the angle of said internal frame with respect to the angle of said sidewalls
   wherein said cabinet comprises one or more internal shelves comprising one or more removable sections to provide access to said roller grill heating elements;
   wherein said pair of side panels, said back, and said pair of doors extend down below said side walls to create a seal between said roller grill assembly and said cabinet when said pair of sidewalls support said internal frame, thereby preventing heat from escaping from said roller grill assembly and said of cabinet.

8. The device of claim 7, wherein said cabinet doors comprise handles.

9. The device of claim 7, wherein said pair of side panels, said back, said pair of doors, and said top panel of said cabinet are substantially constructed of a transparent material.

\* \* \* \* \*